United States Patent [19]
Engel et al.

[11] Patent Number: 5,241,720
[45] Date of Patent: Sep. 7, 1993

[54] LAUNDRY WASTE WATER TREATMENT AND WASH PROCESS

[75] Inventors: Richard B. Engel, Ft. Pierce; John B. Gallo, Port St. Lucie; Donald H. Bladen, Vero Beach; Richard B. Engel, Jr., Port St. Lucie; Keith R. Schneider, Gainesville, all of Fla.

[73] Assignee: Tri-O-Clean Laundry Systems, Inc., Fort Pierce, Fla.

[21] Appl. No.: 941,267

[22] Filed: Sep. 4, 1992

[51] Int. Cl.$^5$ .............................................. D06F 39/08
[52] U.S. Cl. ....................................... 8/158; 68/13 R; 68/18 F; 68/207
[58] Field of Search ................. 8/158; 68/13 R, 18 R, 68/18 F, 183, 207; 422/186.11, 186.12

[56] References Cited

U.S. PATENT DOCUMENTS

| | | | |
|---|---|---|---|
| 2,404,778 | 7/1946 | Allison | 422/186.11 |
| 2,529,802 | 11/1950 | Glass | 68/183 |
| 3,065,620 | 11/1962 | Houser | 68/13 R |
| 3,130,570 | 4/1964 | Rentzepis | 68/13 R |
| 3,194,628 | 7/1965 | Cannon | 68/13 R X |
| 3,963,625 | 6/1976 | Lowther | 422/186.11 |
| 4,156,652 | 5/1979 | Wiest | 422/186.12 X |
| 5,097,556 | 3/1992 | Engel et al. | 8/158 |

Primary Examiner—Philip R. Coe
Attorney, Agent, or Firm—Aquilino & Welsh

[57] ABSTRACT

A method and apparatus of washing laundry without hot water and detergent using a closed-loop ozonated wash water system wherein wash water maintained in a storage tank is ozonated by an ozone generator prior to use in the washing machine. The ambient air used in the ozone generator to generate the ozone is undried and temperature controlled. The system includes a novel injector including a vacuum pump for entraining ozone into the water in the storage tank. The spent wash water is collected, filtered and reused, thereby eliminating waste water disposal problems, resulting in considerable water and energy savings.

10 Claims, 1 Drawing Sheet

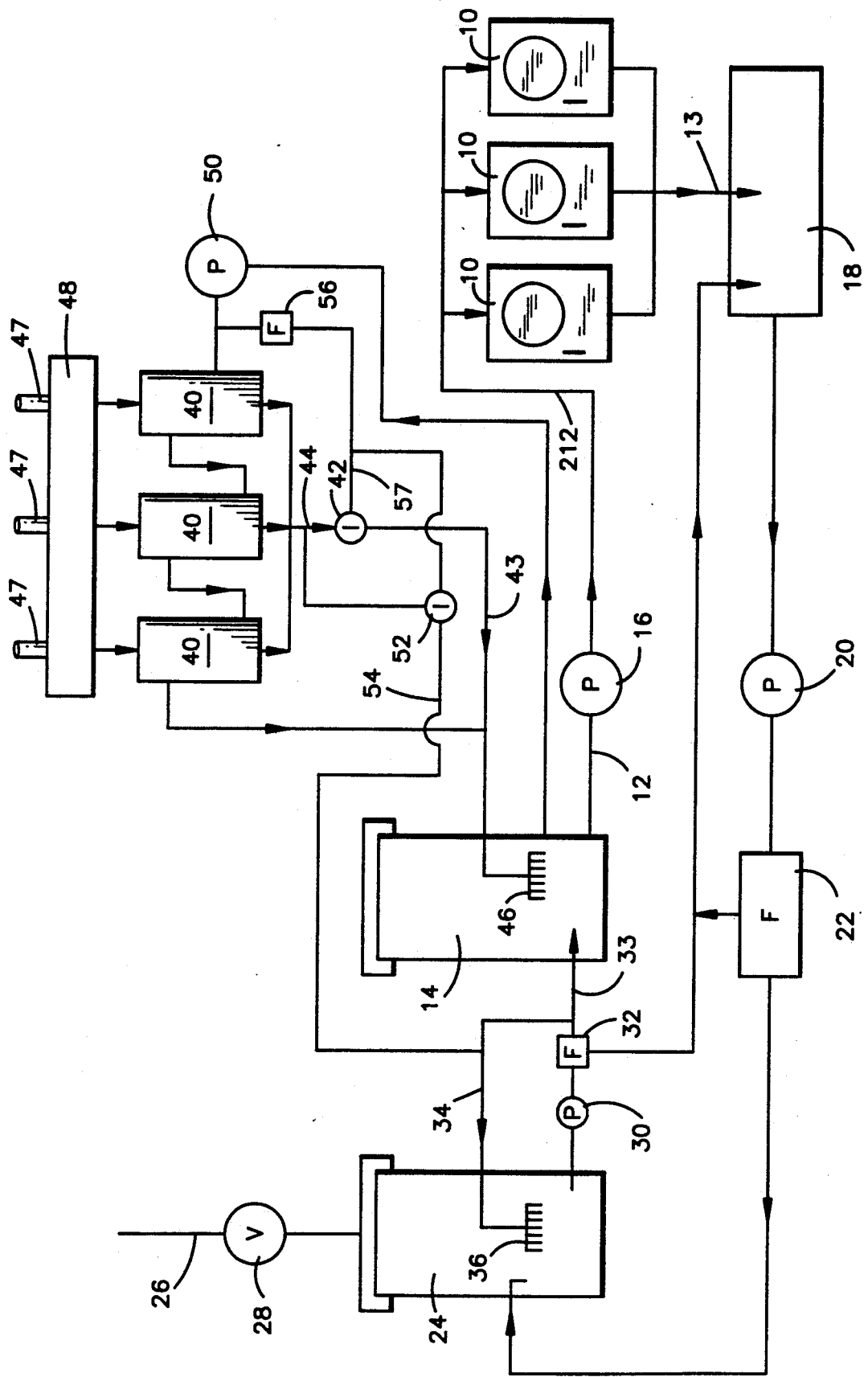

LAUNDRY WASTE WATER TREATMENT AND WASH PROCESS

BACKGROUND AND SUMMARY OF THE INVENTION

The present invention relates to a laundry waste water treatment and wash process, and in particular, to such a process using ozone as a cleaning and disinfecting agent. The invention is an improvement over U.S. Pat. No. 5,097,556, issued Mar. 24, 1992, to the assignee of the present invention. The disclosure and technologies discussed in U.S. Pat. No. 5,097,556 are incorporated herein by way of reference.

Ozone, a gas at room temperature formed by a combination of free individual oxygen molecules, is a powerful oxidizing agent, and as such, is highly efficient in the removal of soil and other contamination materials from textiles. In the prior patent, a process for washing laundry using a closed-loop wash water system was disclosed in which a wash water supply is ozonated and delivered to a series of washing machines for washing laundry. The used wash water is collected at the end of the cycle and recirculated back to the storage means for re-use. The waste wash materials, such as soil, lint and so forth, are removed from the wash water at the end of the wash cycle prior to it being recycled back to the supply. Filtering, recirculating and replenishing wash water lost during the washing process are among the process steps disclosed in the patent.

Whereas the prior discussed process operates quite satisfactorily for the purpose of washing clothes, the present invention relates to an improved process for accomplishing an improved result, and in particular, to an improved method of mixing the ozone with the wash water and an improved temperature control system which generates ozone ($O_3$) and hydroxyl (HO), which aids in the cleaning and decontamination process. In particular, it has been found that cool and undried air will generate a high percentage of hydroxyl along with ozone when used with the corona generator of the present invention. Furthermore, ozone entrainment is enhanced by using a liquid ring vacuum pump which generates a vacuum in the flow line between the ambient air inlet across the ozone generator and out to the storage tank. The liquid ring pump acts as a mixer when handling saturated vapor gas mixtures, and this greatly increases the effective capacity of the pump in order to draw increased amounts of ozone for entrainment into the wash water being held in the system.

With the present invention, the process and apparatus shown and described in U.S. Pat. No. 5,097,556 is much more efficient and greatly enhanced for the purposes described.

Among the objects of the present invention are the provision of an improved laundry waste water treatment system using ozone for cleaning and decontamination laundry materials, which saves water, eliminates the need for hot water, soap and chemicals, and greatly reduces the cost of operation.

Another object is the provision of an improved laundry treatment system which generates a high percentage of hydroxyl in combination with ozone to enhance the cleaning process.

A still further object of the present invention is the provision of a laundry wash system using generated ozone entrained in the wash water having an improved ozone entrainment system to increase the efficiency of the ozone wash process.

These and other objects will become apparent with reference to the following drawings and specification.

BRIEF DESCRIPTION OF THE DRAWINGS

FIG. 1 illustrates a closed-loop laundry waste water treatment and wash system in accordance with the present invention.

DESCRIPTION OF THE PREFERRED EMBODIMENTS

Referring to the drawings, the laundry waste water treatment and wash process and system includes a plurality of washing machines 10 of the type found in a commercial laundry institution, laundromat, hotel, school, dormitory, or other similar establishment where a great deal of laundry is washed. Each machine is capable of being operated independently of the other, and is supplied with ozonated wash water by a water supply line 12 connected to a water holding or contact tank 14. Wash water is pumped into the machines 10 using a supply pump 16 upon activation of the machine. The washing machines 10 are drained through a drain line 13 into a sump 18, which collects the waste water for recycling. After a wash cycle is completed, the spent wash water in the sump 18 is pumped by a sump pump 20 through a suitable filter medium 22 into a holding or storage tank 24. A supply of fresh water may also be added from a make-up water supply line 26 by a gravity feed to the storage tank 24 or by means of a make-up water valve 28. Prior to an initiation of a wash cycle, water from the storage tank 24 is fed by a transfer pump 30 through a filter 32 directly into the bottom of the contact tank 14. A feedback line 34 forms a water feedback loop which continuously circulates water back into the storage tank 24 and mixes it with the water in the tank using storage tank mixers 36.

A plurality of ozone generators 40 create ozone and hydroxyl to be combined into the water in the contact tank 14 at a controlled rate. It is well known in the ozone generating art that the drier the ambient air, the more ozone is produced. Therefore, it is desirable to control the moisture content of the air by controlling the temperature of the air. This is accomplished by passing outside ambient air through inlets 47 into a temperature controller 48 which may be a conventional air conditioning unit. The cooled air thus is maintained at a preset moisture level to insure a consistent output of ozone and hydroxyl. As the undried, cooled ambient air is passed over a source of high voltage electric discharge, preferably by passing it across a corona discharge tube, part of the air is transformed into charged oxygen ions which recombine to form $O_3$, or ozone. At the same time, the moisture, or water, in the air is broken down from $H_2O$ into H and OH radicals. The hydroxyl radical (OH) and the ozone ($O_3$) are removed from the ozone generators 40 and are entrained into the water by means of injectors 42, which are preferably liquid ring vacuum pumps which draw a vacuum in the ozone feed lines 44. The ozone ($O_3$) and hydroxyl (HO) are fed through an ozone injection line 43 into the contact tank 14. The ozone and hydroxyl are mixed into the wash water in the contact tank 14 using contact tank mixers 46.

The ozone generators are the type shown and described in U.S. Pat. No. 5,097,556, although it will be appreciated that other ozone generators which create a corona type electric discharge may be equally applicable to the present invention. Ozonated water within the storage tank 14 is recycled by a cooling pump 50 back into the ozone generators 40 to cool the generators. This water is also fed through filter 56 through injector water feed line 57 into injector 42 and recycled back into the contact tank 14. Water is also recycled through injector water feed line 57 into injector 52 and back into storage tank 24. The secondary injector 52 is also connected to vacuum line 44 and feeds an ozone and hydroxyl mixture through a secondary line 54 back into recirculation line 34, which in turn is connected into the storage tank 24.

In use, a continuous closed fluid flow loop is provided using institutional or commercial laundry washing machines 10 or the like. It will be appreciated that the disclosed system is not necessarily limited to these types of heavy-duty laundry systems, but could be adapted equally well for home use by using smaller components and fluid flow apparatus. Each machine would normally be capable of washing up to a 125 pound load. The wash water is fed from the contact tank 14 into the machines through a water supply line 12 by means of a supply pump 16. The wash water in the holding tank 14 is already combined with the ozone and hydroxyl to maximize cleaning without the use of hot water and soaps, detergents, or other chemical products to enhance the cleaning of the laundry.

Water in the storage tank 24 is maintained at a usable level by recycling and also by adding make-up water from the make-up line 26 through valve 28 when needed. Water from the storage tank 24 is fed through a filter 32 directly into the contact tank 14 by means of a pump 30. A recirculation line 34 feeds part of the water in line 33 back into the storage tank 24. Mixers 36 at the end of the recirculation line 34 keep the water in the storage tank 24 in motion, ensuring that the water in the storage tank is mixed particularly when make-up water is added to the system from supply line 26.

The liquid ring vacuum pump injector 42 draws a vacuum in the ozone and hydroxyl feed lines 44. This vacuum accelerates the feeding of ambient air into the ozone generators 40. Ozone is generated in each of the ozone generators 40 by passing ambient air across a corona discharge tube. This mixture is entrained in the storage tank 14 by the injectors and mixed in the tank using the mixers 46.

In summary, the system of the present invention provides a closed loop recycled wash water system using ozone and hydroxyl made from undried, temperature controlled ambient air to wash clothes without using hot water or chemicals such as soaps or detergents. The system further includes a vacuum pump to enhance entrainment of the ozone/hydroxyl mixture into the wash water used in the washing machines.

It will be appreciated that modifications may be made in the system and apparatus described hereinabove in keeping within the scope of the present invention, as defined in the following claims.

We claim:

1. A method of washing laundry using a closed-loop wash water system comprising the steps of:
    maintaining a supply of wash water in a storage tank;
    supplying undried ambient air to an ozone generator, treating the undried air with a source of electric discharge and generating ozone thereby;
    mixing the ozone into said wash water supply;
    delivering said ozonated wash water supply to a washing means upon commencement of a wash cycle;
    washing said laundry in said washing means;
    collecting said wash water supply in a collecting means at the end of the wash cycle; and,
    recirculating said wash water supply from said collecting means to said storage means.

2. The method of claim 1 further including the step of controlling the moisture content of the ambient air by controlling the temperature thereof.

3. The method of claim 2 being further defined by air conditioning the ambient air.

4. The method of claim 1 further including generating a hydroxyl radical when the undried ambient air is treated by the ozone generator, and combining said hydroxyl radical with said ozone and mixing the combination in said wash water supply.

5. The method of claim 1 further including the step of creating a vacuum in a supply line between said ozone generator and said storage means to accelerate entrainment of the ozone in the wash water supply.

6. A method of washing laundry using a closed-loop wash water system comprising the steps of:
    maintaining a supply of wash water in a storage tank;
    supplying undried ambient air to an ozone generator, treating the undried air with a source of electric discharge and generating ozone thereby;
    mixing the ozone into said wash water supply;
    creating a vacuum in a supply line between said ozone generator and said storage means to accelerate entrainment of the ozone into the wash water supply;
    delivering said ozonated wash water supply to a washing means upon commencement of a wash cycle;
    washing said laundry in said washing means;
    collecting said wash water supply in a collecting means at the end of the wash cycle; and,
    recirculating said wash water supply from said collecting means to said storage means.

7. A method of washing laundry using a closed-loop wash water system comprising the steps of:
    maintaining a supply of wash water in a storage tank;
    supplying undried ambient air to an ozone generator, treating the undried air with a source of electric discharge and generating ozone and a hydroxyl radical during the air treating step;
    mixing the ozone into said wash water supply;
    delivering said ozonated wash water supply to a washing means upon commencement of a wash cycle;
    washing said laundry in said washing means;
    collecting said wash water supply in a collecting means at the end of the wash cycle; and,
    recirculating said wash water supply from said collecting means to said storage means.

8. The method of claim 7 further including the step of creating a vacuum in a supply line between said ozone generator and said storage means to accelerate entrainment of the ozone in the wash water supply.

9. The method of claim 7 further including the step of controlling the moisture content of the ambient air by controlling the temperature thereof.

10. The method of claim 7 being further defined by air conditioning the ambient air.

* * * * *